United States Patent
Wang

(10) Patent No.: US 6,473,461 B1
(45) Date of Patent: *Oct. 29, 2002

(54) HALF-PIXEL MOTION ESTIMATION IN MOTION VIDEO SIGNAL ENCODING

(75) Inventor: Albert S. Wang, Palo Alto, CA (US)

(73) Assignee: Microsoft Corporation, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/542,709

(22) Filed: Apr. 4, 2000

Related U.S. Application Data

(63) Continuation of application No. 08/869,082, filed on Jun. 4, 1997, now Pat. No. 6,067,322.

(51) Int. Cl.[7] .............................. H04B 1/66
(52) U.S. Cl. ............................... 375/240.16
(58) Field of Search ............... 375/240.01, 240.02, 375/240, 240.15, 240.16, 240.17, 240.18; 348/390.1, 405.1, 413.1, 415.1, 416.1, 420.1, 419.1, 423.1, 699, 700; 382/232, 234, 236; H04B 1/60

(56) References Cited

U.S. PATENT DOCUMENTS

| | | | | |
|---|---|---|---|---|
| 4,873,573 A | * | 10/1989 | Thomas et al. | 358/133 |
| 5,247,355 A | | 9/1993 | Frederiksen | 358/105 |
| 5,351,095 A | | 9/1994 | Kerdranvat | 348/699 |
| 5,379,351 A | | 1/1995 | Fandrianto et al. | 382/41 |
| 5,414,469 A | | 5/1995 | Gonzales et al. | 348/408 |
| 5,453,801 A | | 9/1995 | Kim | 348/699 |
| 5,473,379 A | | 12/1995 | Horne | 348/416 |
| 5,488,419 A | * | 1/1996 | Hui et al. | 348/402 |
| 5,493,344 A | | 2/1996 | Yu | 348/699 |
| 5,502,492 A | | 3/1996 | Jung | 348/413 |
| 5,512,952 A | | 4/1996 | Iwamura | 348/416 |
| 5,537,155 A | | 7/1996 | O'Connell et al. | 348/699 |
| 5,557,341 A | | 9/1996 | Weiss et al. | 348/699 |
| 5,576,767 A | | 11/1996 | Lee et al. | 348/413 |
| 5,587,741 A | | 12/1996 | Kim | 348/416 |
| 5,623,312 A | | 4/1997 | Yan et al. | 348/416 |
| 5,623,313 A | | 4/1997 | Naveen | 348/416 |
| 5,719,630 A | * | 2/1998 | Senda | 348/406 |
| 5,748,903 A | | 5/1998 | Agarwal | 395/200.77 |
| 5,768,537 A | | 6/1998 | Butter et al. | 395/200.77 |
| 5,805,228 A | | 9/1998 | Proctor et al. | 348/422 |
| 5,905,542 A | * | 5/1999 | Linzer | 348/699 |
| 5,936,672 A | * | 8/1999 | Ahnn | 348/416 |
| 6,067,322 A | * | 5/2000 | Wang | 375/240 |
| 6,292,589 B1 | * | 9/2001 | Chow et al. | 382/239 |

OTHER PUBLICATIONS

"Video Coding for Low Bitrate Communication", *ITU–T, Draft H.263: Line Transmission of Non–Telephone Signals*, Int'l Telecommunication Union, (May 2, 1996).

* cited by examiner

*Primary Examiner*—Chris Kelley
*Assistant Examiner*—Tung Vo
(74) *Attorney, Agent, or Firm*—Lee & Hayes, PLLC

(57) ABSTRACT

A motion estimator/compensator determines whether to use half-pixel motion vector encoding by comparing the relative benefit of using half-pixel encoding, represented in terms of distortion between the macroblock as encoded and prior to encoding, to the processing burden imposed upon the client computer system in decoding the half-pixel encoded macroblock. Specifically, the motion estimator/compensator quantifies distortions in encoding a subject macroblock as a motion vector to (i) a whole pixel pseudo-macroblock, (ii) a half-column pixel pseudo-macroblock, (iii) a half-row pixel pseudo-macroblock, or (iv) a half-column/half-row pixel pseudo-macroblock. The type of motion vector encoding having the smallest combination of distortion and decoder processing burden is selected and used to encode the subject macroblock. Thus, each type of half-pixel motion estimation is evaluated individually and used for encoding the subject macroblock only if the benefit of the type of half-pixel motion estimation justifies the corresponding additional processing burden imposed upon a client computer system.

51 Claims, 7 Drawing Sheets

HALF-PIXEL MOTION ESTIMATION IN MOTION VIDEO SIGNAL ENCODING

This application is a continuation of U.S. patent application Ser. No. 08/869,082, filed Jun. 4, 1997.

FIELD OF THE INVENTION

The present invention relates to digital video signal compression and, in particular, to a particularly efficient signal encoding mechanism for encoding digital video signals according to digital video standards such as the ITU standard H.263.

BACKGROUND OF THE INVENTION

With the advent of digital video products and services, such as Digital Satellite Service (SSS) and storage and retrieval of video streams on the Internet and, in particular, the World Wide Web, digital video signals are becoming ever present and drawing more attention in the marketplace. Because of limitations in (i) digital signal storage capacity, (ii) in network and broadcast bandwidth, and (iii) in client computer system process bandwidth, compression of dc digital video signals has become paramount to digital video storage and transmission. As a result, many standards for compression and encoding of digital video signals have been promulgated. For example, the International Telecommunication Union (ITU) has promulgated the H.261 and H.263 standards for digital video encoding. Additionally, the International Standards Organization (ISO) has promulgated the Motion Picture Experts Group (WEG), MPEG-1, and MPEG-2 standards for digital video encoding.

These standards specify with particularity the form of encoded digital video signals and how such signals are to be decoded for presentation to a viewer. However, significant discretion is left as to how the digital video signals are to be transformed from a native, uncompressed format to the specified encoded format. As a result, many different digital video signal encoders currently exist and many approaches are used to encode digital video signals with varying degrees of compression achieved.

In general, significant degrees of compression of motion video signals achieved by today's motion video signal encoders force a compromise between encoded signal quality and bandwidth consumed by the encoded video signal. Specifically, encoding a motion video signal such that more of the original content and quality of the motion video signal is preserved consumes additional bandwidth. Conversely, encoding a motion video signal so as to minimize consumed bandwidth generally degrades the quality of the encoded motion video signal.

In current systems for delivering motion video signals to a client computer system for display for a user, there are primarily two types of bandwidth which are limited. The first is delivery bandwidth, i.e., the bandwidth of the transmission medium through which the encoded motion video signal is delivered to the client computer system. The second is client processing bandwidth, i.e., the amount of processing capacity which is available to decode the encoded motion video signal within the client computer system. As greater and greater degrees of compression are realized by today's motion video signal encoders, greater and greater processing capacity is required by client computer systems which decode these encoded motion video signals. In general, such client computer systems must decode and display as much as thirty frames per second. If the available processing bandwidth is exceeded, some or all of the sequence of video images are lost and, therefore, so is the infegrity of the motion video signal. If an encoded motion video signal errs on the side of conserving processing bandwidth, the quality of the motion video image can be compromised significantly.

The format of H.263 encoded digital video signals is known and is described more completely in "ITU-T H.263: Line Transmission of Non-Telephone Signals, Video Coding for Low Bitrate Communication" (hereinafter "ITU-T Recommendation H.263"). Briefly, a digital motion video image, which is sometimes called a video stream, is organized hierarchically into groups of pictures which includes one or more frames. Each frame represents a single image of a sequence of images of the video stream and includes a number of macroblocks which define respective portions of the video image of the frame. An I-frame is encoded independently of all other frames and therefore completely represents an image of the sequence of images of the video stream. P-frames are motion-compensated frames and are therefore encoded in a manner which is dependent upon other frames. Specifically, a P-frame is a predictively motion-compensated frame and depends only upon one I-frame or, alternatively, another P-frame which precedes the P-frame in the sequence of frames of the video image. The H.263 standard also describes BP-frames; however, for the purposes of description herein, a BP-frame is treated as a P-frame.

All frames are compressed by reducing redundancy of image data within a single frame. Motion-compensated frames are further compressed by reducing redundancy of image data within a sequence of frames. Since a motion video signal includes a sequence of images which differ from one another only incrementally, significant compression can be realized by encoding a number of frames as motion-compensated frames, i.e., as P-frames. In addition, reconstructing motion-compensated frames represents a significant portion of the processing required to decode an encoded motion video signal.

In motion estimation, each macroblock of a frame is compared to a number of different equivalent-sized portions of a previous frame. In an exhaustive motion estimation search, a macroblock, which represents a 16-pixel by 16-pixel block of a frame, is compared to every possible 16-pixel by 16-pixel block of a previous frame, even blocks which are not aligned on macroblock boundaries. In pursuit of even better motion estimation, some systems interpolate half-pixels between pixels of the previoustame and compare each macroblock to each 16-pixel by 16-pixel block of half-pixels of the previous frame. However, exhaustive searching of every possible 16-pixel by 16-pixel block of pixels and every possible 16-pixel by 16-pixel block of half-pixels is, in terms of computation and processing resources, prohibitively expensive.

Accordingly, conventional motion estimation systems try to derive a motion vector between a macroblock and a 16-pixel by 16-pixel block of a previous frame without exhaustively comparing all possible blocks. One such system is the "three-stage log search plus half-pixel." However, encoding macroblocks to include motion vectors to 16-pixel by 16-pixel block of half-pixels requires substantial processing by a decoder of a client computer system which reconstructs the macroblocks from the motion vectors since such a decoder must re-derive the half-pixels in decoding the macroblocks. Client computer systems in which decoders typically operate are generally smaller, slower, less expensive computer systems and therefore have less processing capacity than computers in which encoders operate. In addition, each frame must be decoded within a particular amount of time to display successive frames quickly enough that the viewer perceives motion in the video image. Additional processing requirements introduced by half-pixel encoding can push the aggregate processing requirements of motion video image decoding beyond the capability of the client computer system.

What is needed is a motion video signal encoding mechanism in which the benefits of half-pixel motion estimation are realized while minimising the processing burden imposed upon the decoder of the client computer system.

SUMMARY OF THE INVENTION

In accordance with the present invention, a motion estimator/compensator determines whether to use half-pixel motion vector encoding by comparing the relative benefit of using half-pixel encoding to the processing cost of the client computer system in decoding the half-pixel encoded macroblock. Specifically, the motion estimator/compensator quantifies the following distortions: (i) a whole pixel distortion between a subject macroblock and a whole pixel pseudo-macroblock, (ii) a half-column pixel distortion between the subject macroblock and a half-column pixel pseudo-macroblock, (iii) a half-row pixel distortion between the subject macroblock and a half-row pixel pseudo-macroblock, and (iv) a half-column/half-row pixel distortion between the subject macroblock and a half-column/half-row pixel pseudo-macroblock. Each distortion represents the difference between the original macroblock and the macroblock encoded as a motion vector.

Each quantified distortion is combined with a respective processing burden associated with the specific type of half-pixel encoding. For example, a whole pixel processing burden represents the computational complexity of deriving a whole pixel pseudo-macroblock, i.e., a single read operation per pixel. A half-column pixel processing burden represents the computational complexity of deriving a half-column pseudo-macroblock, i.e., two read operations of adjacent memory locations, two addition operations, and one shift operation. A half-row processing burden represents the computational complexity of deriving a half-row pseudo-macroblock, i.e., two read operations of relatively distant memory locations, two addition operations, and one shift operation. A half-column/half-row processing burden represents the computational complexity of deriving a half-column/half-row pseudo-macroblock, i.e., four read operations of relatively distant memory locations, four addition operations, and one shift operation.

In one embodiment, the difference between the half-column pixel distortion and the whole pixel distortion represents the improvement in encoded motion video signal quality achieved by using half-column pixel motion estimation in encoding the subject macroblock. The motion estimator/compensator compares this difference to a predetermined half-column threshold which represents an additional processing burden imposed upon a client computer system in decoding the subject macroblock if encoded using half-column pixel motion estimation. Specifically, the predetermined half-column threshold represents the difference between the whole pixel processing burden and the half-column processing burden. If the difference between distortions is less than the predetermined half-column threshold, the benefit of half-column motion estimation does not justify the additional processing burden imposed upon the client computer system and half-column motion estimation is not used in encoding the subject macroblock.

The motion estimator/compensator determines analogous differences for the half-row distortion and the half-column/half-row distortion and compares those distortion differences to predetermined half-row and half-column/half-row thresholds, respectively. The predetermined half-row and half-column/half-row thresholds represent additional processing burdens imposed upon a client computer system in decoding the subject macroblock if encoded using half-row or half-column/half-row motion estimation, respectively. In other words, the predetermined half-row and half-column/half-row thresholds represent (i) the difference between the half-row processing burden and the whole pixel processing burden and (ii) the difference between the half-column/half-row processing burden and the whole pixel processing burden, respectively.

In an alternative embodiment, each processing burden is weighted according to the processing capacity of a particular client computer system and the corresponding distortion is added to the weighted processing burden to quantify a distortion/processing burden combination. The particular one of the whole-pixel, half-column, half-row, and half-column/half-row combinations which has the smallest quantified value is selected as the best compromise between distortion and processing burden imposed upon the client computer system.

Thus, each type of half-pixel motion estimation is evaluated individually and used for encoding the subject macroblock only if the benefit of the type of half-pixel motion estimation justifies the corresponding additional processing burden imposed upon a client computer system.

Since decoding macroblocks encoded using half-column motion estimation requires more processing than decoding macroblocks encoded using whole pixel motion estimation, the predetermined half-column threshold is greater than zero. In addition, decoding macroblocks encoded using half-row motion estimation requires more processing than decoding macroblocks encoded using half-column motion estimation, and decoding macroblocks encoded using half-column/half-row motion estimation requires more processing than decoding macroblocks encoded using half-row motion estimation. Accordingly, the predetermined half-column/half-row threshold is greater than the predetermined half-row threshold, and the predetermined half-row threshold is greater than the predetermined half-column threshold. Similarly, the half-column/half-row processing burden is greater than the half-row processing burden which is greater than the half-column processing burden which in turn is greater than the whole pixel processing burden.

Thus, according with the principles of the present invention, encoded motion video signal quality is enhanced while ensuring the processing bandwidth of client computer systems is not exceeded in decoding the encoded motion video signals.

DETAILED DESCRIPTION

As described above, half-pixel motion estimation can improve motion video image quality but at the cost of increased processing demands on a decoder which may have insufficient processing capabilities to properly decode half-pixel motion estimated frames in real time, i.e., at the frame rate of the encoded motion video signal. However, half-pixel motion estimation can achieve significant benefits in terms of degrees of compression which can be obtained and in terms of image quality.

Figure 1:
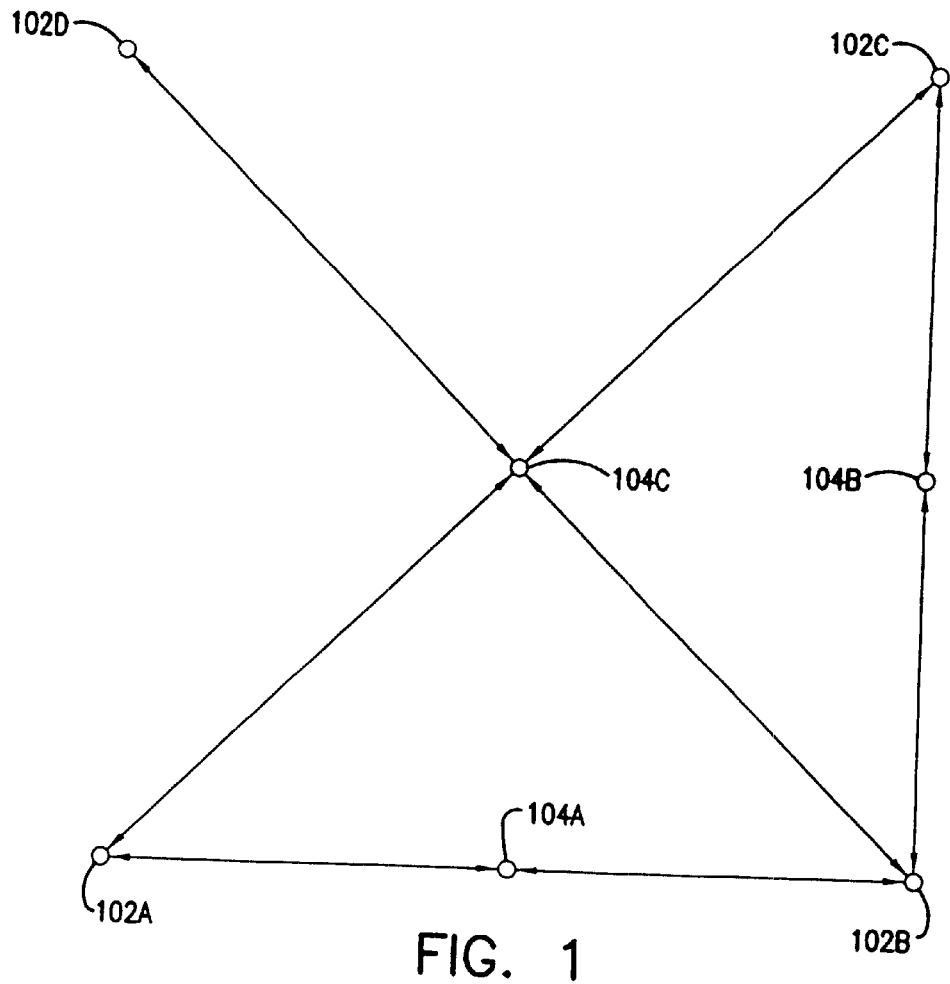
FIG. 1 is a diagram of whole pixels, a half-column pixel, a half-row pixel, and a half-column/half-row pixel.

In accordance with the present invention, the benefit of half-pixel motion estimation for a particular macroblock is determined and weighed against additional processing costs imposed upon a decoder of the encoded motion video signal by half-pixel motion estimation. As shown in FIG. 1, whole pixels 102A–D are pixels of the current frame. Pixel 104A is a half-column pixel in that pixel 104A is aligned with a row of whole pixels, i.e., whole pixels 102A–B, and lies between columns of whole pixels. In FIG. 1, half-column pixel 104A lies midway between whole pixels 102A–B. Pixel 104B is a half-row pixel in that pixel 104B is aligned with a column of whole pixels, i.e., whole pixels 102B–C, and lies between rows of whole pixels. In FIG. 1, half-row pixel 104B lies midway between whole pixels 102B–C. Pixel 104C is a half-column/half-row pixel in that pixel 104C is not aligned with any column or row of whole pixels but instead lies midway between four adjacent whole pixels. In FIG. 1, half-column/half-row pixel 104C lies midway between whole pixels 102A–D.

As used herein, a pseudo-macroblock is a 16-pixel by 16-pixel block of pixels of a frame and which is generally in the format of a macroblock which is not necessarily aligned along macroblock boundaries. A motion vector generally identifies a pseudo-macroblock. A whole pseudo-macroblock is a pseudo-macroblock which includes whole pixels. A half-column pseudo-macroblock is a pseudo-macroblock which includes half-column pixels. A half-row pseudo-macroblock is a pseudo-macroblock which includes half-row pixels. A half-column/half-row pseudo-macroblock is a pseudo-macroblock which includes half-column/half-row pixels.

Encoding a particular macroblock of the current frame as a motion vector to a half-column pseudo-macroblock generally requires the decoder to perform at least two read operations to retrieve two whole pixels, two addition operations to sum and round the two whole pixels, and one shift operation to divide the rounded sum by two to thereby derive each half-column pixel, e.g., pixel 104A. Since each pseudo-macroblock includes 256 pixels, the additional processing burden imposed upon the decoder is 256 additional read operations, 512 additional addition operations, and 256 additional shift operations for each macroblock encoded using half-column motion estimation.

Encoding a particular macroblock of the current frame as a motion vector to a half-row pseudo-macroblock generally requires the decoder to perform at least the same two read operations, two addition operations, and one shift operation to derive each half-row pixel, e.g., pixel 104B. Deriving a half-row pixel, e.g., pixel 104B, generally requires more processing than deriving a half-column pixel, e.g., pixel 104A, since pixels 102A–B are generally stored in adjacent memory locations within a computer implementing motion video signal encoder 200 (FIG. 2) and pixels 102B–C (FIG. 1) are generally stored in relatively distant memory locations. As a result, accessing pixels 102B–C is more likely to result in a cache miss and a less efficient access of memory.

Encoding a particular macroblock of the current frame as a motion vector to a half-column/half-row pseudo-macroblock generally requires the decoder to perform at least four read operations to retrieve four whole pixels, four addition operations to produce a rounded sum of the four whole pixels, and 1 shift operation to divide the rounded sum by four to thereby derive each half-column/half-row pixel, e.g., pixel 104C. For encoding an entire macroblock, 768 additional read operations, 1024 addition operations, and 256 shift operations are required to encode the macroblock as a half-column/half-row macroblock. In addition, the four reads involve the inefficiency described above with respect to half-row pseudo-macroblocks. Deriving a half-column/half-row pixel therefore generally requires significantly more processing than deriving either a half-column pixel or a half-row pixel.

Figure 2:
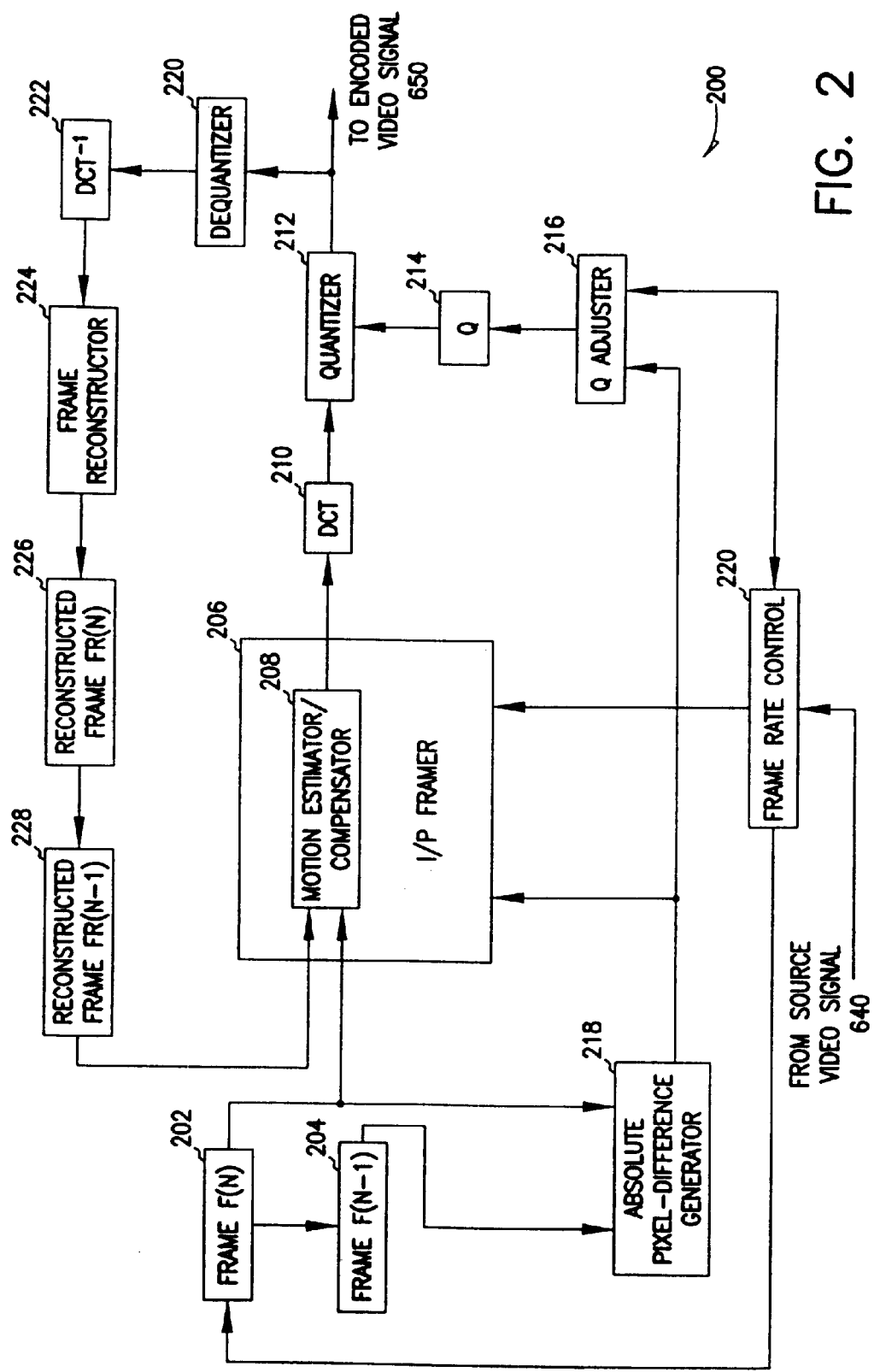
FIG. 2 is a block diagram of a motion video signal encoder which includes a motion estimator/compensator in accordance with the principles of the present invention.

Appreciation of the present invention is facilitated by a brief description of the encoding of motion video signals. A video signal compressor 200 in accordance with the present invention is shown in FIG. 2. Video signal compressor 200 is described more completely in co-pending U.S. patent application Ser. No. 08/819,507 by Albert Wang entitled "Digital Video Signal Encoder and Encoding Method" filed Mar. 14, 1997 and that description is incorporated herein by reference. Briefly, video signal compressor 200 receives a frame of a video signal from a video source (not shown) which can include, for example, a video camera, a video cassette player, a video laser disk player, or similar video source. Video signal compressor 200 stores the frame in buffer 202, and the frame stored in buffer 202 is sometimes referred to herein as the current frame. I/P framer 206 of video signal compressor 200 includes a motion estimator/compensator 208 which in turn retrieves the current frame from buffer 202 and a reconstructed previous frame from a buffer 228 and derives motion vectors which represent motion between the current and previous frames. The reconstructed previous frame is reconstructed from a previously encoded frame as described more completely below. For each of one or more macroblocks of the current frame, motion estimator 206 derives a motion vector which specifies a portion of the previous reconstructed frame which the macroblock corresponds and an associated motion vector error signal. A motion vector specifies a motion-compensated macroblock in terms of a vector to an equal-sized portion of another frame. A macroblock specified by a motion vector of a particular macroblock is sometimes referred to herein as a macroblock which is temporally displaced from the particular macroblock A motion vector error signal represents an amount of variation between the macroblock and a temporally displaced macroblock of the macroblock. Motion estimator/compensator 208 and the derivation of motion vectors by motion estimator/compensator 208 are described in greater detail below.

Motion estimator/compensator 208 produces a current motion-compensated frame from the motion vectors and the current and previous frames received from buffers 202 and 228. Motion estimator/compensator 208 passes the motion-compensated frame to transform coder 210 which performs discrete cosine transformation (DCT) on the motion-compensated macroblocks of the motion-compensated frame to produce a transformed frame. Transform coder 210 passes the transformed frame to a quantizer 212. Quantizer 212 quantizes coefficients used in transform coder 210 and these coefficients are then used later for Huffman coding the transformed frame to complete compression of the current frame retrieved from buffer 202.

As described briefly above, a reconstructed previous frame is used to estimate motion between consecutive frames. The reconstructed previous frame is formed as follows. A dequantizer 220 receives the encoded current frame from quantizer 212 and performs the inverse of the quantization performed by quantizer 212. The dequantized frame is transferred from dequantizer 220 to a transform decoder 222 which performs an inverse discrete cosine transformation of the DCT performed by transform coder 210. A frame reconstructor 224 receives the transformed frame and reconstructs a reconstructed current frame therefrom. Specifically, frame reconstructor 224 reconstructs motion-compensated macroblocks of the frame received from transform decoder 222 by reference to a previously reconstructed frame stored in buffer 228. The reconstructed current frame is stored in a buffer 226 and the reconstructed frame which is previously stored in buffer 226 is moved to buffer 228. Therefore buffer 228 stores a reconstructed previous frame which is reconstructed from the previously encoded frame. Dequantizer 220, transform decoder 222, and frame reconstructor 224 are conventional.

Half-Pixel Weighting in Motion Estimation

In accordance With the present invention, motion estimator/compensator 208 (FIG. 2) reduces the processing requirements of a decoder which decodes the encoded motion video signal produced by motion video signal encoder 200 while simultaneously availing itself of most of the benefit of half-pixel motion estimation. Motion estimator/compensator 208 does so, in one embodiment, according to the steps of logic flow diagram 300 (FIG. 3), in which processing begins in step 302. In step 302, motion estimator/compensator 208 (FIG. 2) quantifies distortion for a particular whole pseudo-macroblock. In one embodiment, the whole pseudo-macroblock is selected using a conventional three-stage log search. The quantified distortion represents a degree of difference between a macroblock of the current frame and a pseudo-macroblock of the previous frame. In one embodiment, the quantified distortion is the root-mean squared (RMS) difference between the macroblock and the pseudo-macroblock. In another embodiment, the quantified distortion is the absolute pixel difference between the macroblock and the pseudo-macroblock. The absolute pixel difference is the average absolute value of the differences of corresponding pixels of the macroblock and the whole pseudo-macroblock. Processing transfers from step 302 (FIG. 3) to step 304.

In step 304, motion estimator/compensator 208 (FIG. 2) quantifies distortion for a half-column pseudo-macroblock corresponding to the particular whole pseudo-macroblock. There are two half-column pseudo-macroblocks which are offset from the whole pseudo-macroblock to either side by one-half pixel: Of these, the half-column pseudo-macroblock whose distortion is less is used. In step 306 (FIG. 3), motion estimator/compensator 208 (FIG. 2) distortion for a half-row pseudo-macroblock corresponding to the particular whole pseudo-macroblock. There are two half-row pseudo-macroblocks which are offset from the whole pseudo-macroblock above and below by one-half pixel. Of these, motion estimator/compensator 208 uses the half-row pseudo-macroblock whose distortion is less. In step 308 (FIG. 3), motion estimator/compensator 208 (FIG. 2) quantifies distortion for a half-column/half-row pseudo-macroblock corresponding to the particular whole pseudo-macroblock. There are four half-column/half-row pseudo-macroblocks which are offset from the whole pseudo-macroblock in any direction by one-half pixel. Of these, motion estimator/compensator 208 uses the half-column/half-row pseudo-macroblock whose distortion is least.

Figure 3:
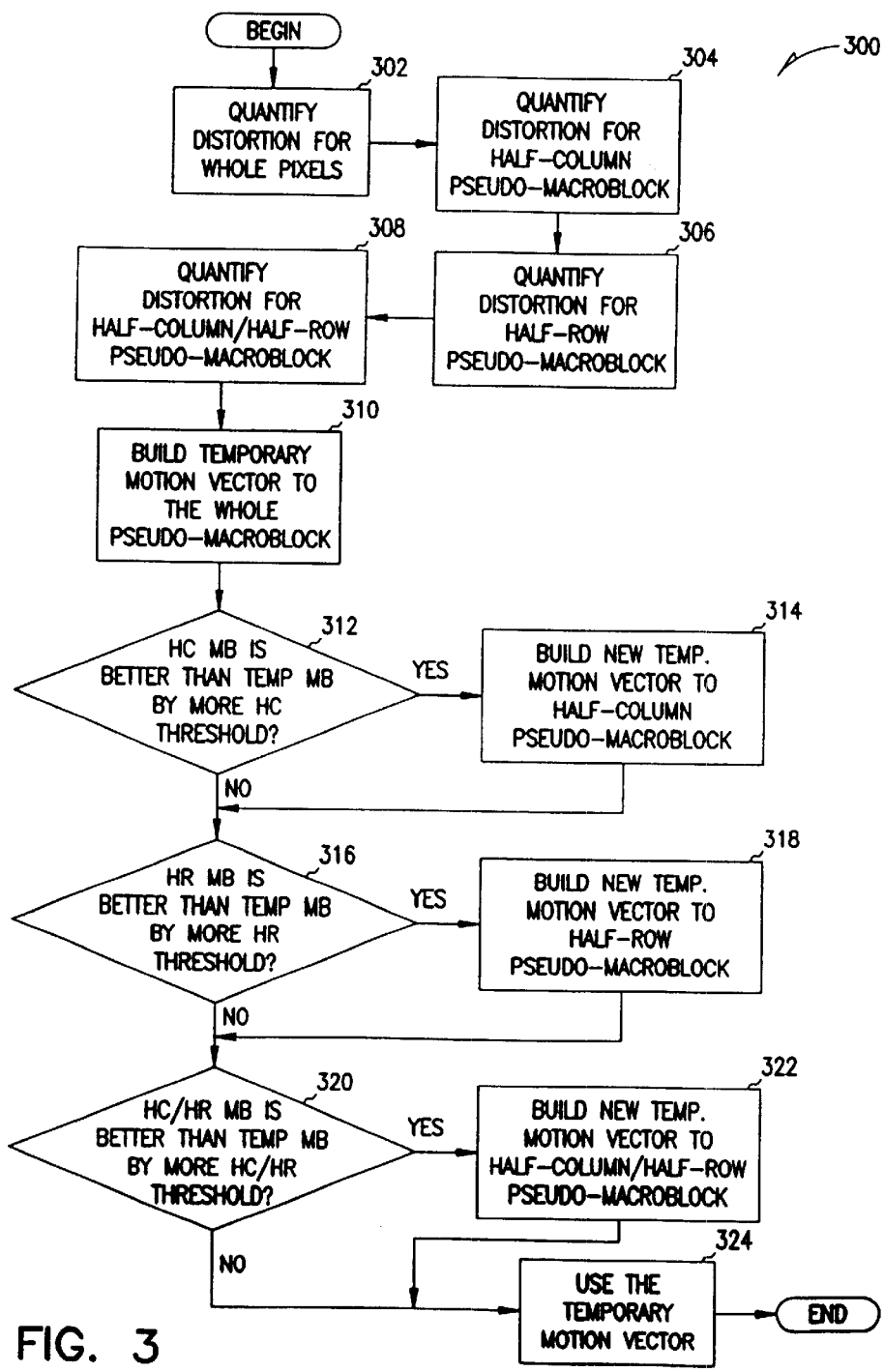
FIG. 3 is a logic flow diagram illustrating the processing of the motion estimator/compensator of FIG. 2 in accordance with the present invention.

Motion estimator/compensator 208 ensures that any benefit from using half-pixel motion estimation more than outweighs any additional processing burden imposed upon a decoder by performance of steps 310–324 (FIG. 3). In steps 310–324, (i) a half-column threshold represents an additional processing burden imposed upon a decoder in decoding a motion vector to a half-column pseudo-macroblock; (ii) a half-row threshold represents an additional processing burden imposed upon a decoder in decoding a motion vector to a half-row pseudo-macroblock; and (iii) a half-column/half-row threshold represents an additional processing burden imposed upon a decoder in decoding a motion vector to a half-column/half-row pseudo-macroblock. Each additional processing burden is relative to a processing burden imposed upon a decoder in decoding a motion vector to a whole-pixel pseudo-macroblock. Because of the relative additional processing burdens imposed upon a decoder as described above, the half-column/half-row threshold is greater than the half-row threshold which is greater than the half-column threshold which in turn is greater than zero.

The distortion quantified in step 302 and a base processing burden reflected implicitly in the predetermined half-column, half-row, and half-column/half-row thresholds collectively represent a combination of distortion and decoder processing realized by whole pixel motion estimation. The distortion quantified in step 304 and a processing burden reflected in the predetermined half-column threshold collectively represent a combination of distortion and decoder processing realized by half-column half-pixel motion estimation. The distortion quantified in step 306 and a processing burden reflected in the predetermined half-row threshold collectively represent a combination of distortion and decoder processing realized by half-row half-pixel motion estimation. The distortion quantified in step 308 and a processing burden reflected in the predetermined half-column/half-row threshold collectively represent a combination of distortion and decoder processing realized by half-column/half-row half-pixel motion estimation.

In one embodiment, the half-column/half-row threshold, half-row threshold, and half-column threshold are two, one and one-half, and one, respectively. Accordingly, if half-column motion estimation has a quantified distortion which is less than a quantified distortion of whole-pixel motion estimation by at least an average absolute pixel difference of one, half-column motion estimation is selected over whole-pixel motion estimation. If half-row motion estimation has a quantified distortion which is less than the quantified distortion of whole-pixel motion estimation by at least an average absolute pixel difference of one and one-half and less than the quantified distortion of half-column motion estimation by at least an average absolute pixel difference of one-half half-row motion estimation is selected over whole-pixel and half-column motion estimation. Similarly, if half-column/half-row motion estimation has a quantified distortion which is less than the quantified distortion of whole-pixel motion estimation by at least an average absolute pixel difference of two and less than the quantified distortion of half-column motion estimation by at least an average absolute pixel difference of one and less than the quantified distortion of half-row motion estimation by at least an average absolute pixel difference of one-half, half-column/half-row motion estimation is selected over whole-pixel, half-column, and half-row motion estimation.

Figure 4:
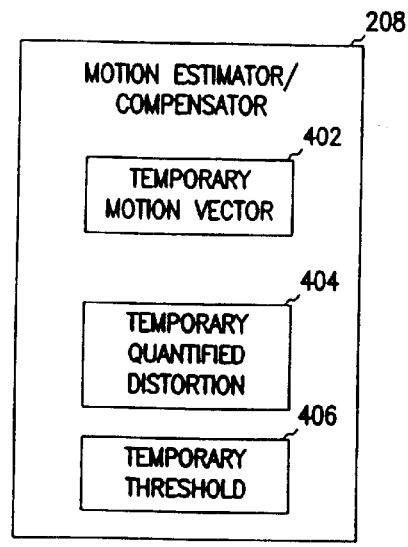
FIG. 4 is a block diagram of the motion estimator/compensator of FIG. 2 in greater detail.

In step 310, motion estimator/compensator 208, which is shown in greater detail in FIG. 4, builds a temporary motion vector 402 to the whole pseudo-macroblock. In addition, motion estimator/compensator 208 stores as a temporary quantified distortion 404 distortion quantified in step 302 (FIG. 3) and stores as a temporary threshold 406 (FIG. 4) a value of zero to indicate no threshold associated with whole pseudo-macroblocks. Temporary threshold 406 represents an amount of additional processing already imposed upon a decoder by temporary motion vector 402. Since temporary motion vector 402 initially is a motion vector to a whole pseudo-macroblock, temporary threshold 406 indicates that no additional processing is initially imposed. In test step 312 (FIG. 3), motion estimator/compensator 208 (FIG. 4) determines whether the distortion of the half-column pseudo-macroblock quantified in step 304 (FIG. 3) is less than temporary quantified distortion 404 (FIG. 4) by at least the half-column threshold. If so, the benefit of half-column motion estimation outweighs additional processing required to derive half-column pixels and processing transfers to step 314 (FIG. 3). In step 314, motion estimator/compensator 208 (FIG. 4) builds as temporary motion vector 402 a motion vector to the half-column pseudo-macroblock; stores as temporary quantified distortion 404 the distortion quantified in step 304 FIG. 3); and stores as temporary threshold 406 (FIG. 4) the half-column threshold. Conversely, if the distortion of the half-column pseudo-macroblock quantified in step 304 (FIG. 3) is not better than temporary quantified distortion 404 (FIG. 4) by at least the half-column threshold, the benefit of half-column motion estimation does not outweigh the additional processing burden imposed and motion estimator/compensator 208 skips step 314 (FIG. 3) such that temporary motion vector 402 (FIG. 4), temporary quantified distortion 404, and temporarily threshold 406 remain unchanged.

In test step 316 (FIG. 3), motion estimator/compensator 208 (FIG. 4) determines whether the distortion of the half-row pseudo-macroblock quantified in step 306 (FIG. 3) is less than temporary quantified distortion 404 (FIG. 4) by at least the half-row threshold less temporary threshold 406. If so, the benefit of half-row motion estimation is sufficiently better than both whole pixel and half-column pixel motion estimation to outweigh additional processing required to derive half-row pixels and processing transfers to step 318 (FIG. 3). In step 318, motion estimator/compensator 208 (FIG. 4) builds as temporary motion vector 402 a motion vector to the half-row pseudo-macroblock; stores as temporary quantified distortion 404 the distortion quantified in step 306 (FIG. 3); and stores as temporary threshold 406 (FIG. 4) the half-row threshold. Conversely, if the quantified distortion of the half-row pseudo-macroblock determined in step 306 (FIG. 3) is not less than the temporary quantified distortion by at least the half-row threshold less temporary threshold 406 (FIG. 4), the benefit of half-row motion estimation is not sufficiently better than either whole pixel or half-column pixel motion estimation to outweigh the additional processing burden imposed. Accordingly, motion estimator/compensator 208 skips step 318 (FIG. 3) such that temporary motion vector 402 (FIG. 4), temporary quantified distortion 404, and temporary threshold 406 remain unchanged.

In test step 320 (FIG. 3), motion estimator/compensator 208 (FIG. 4) determines whether the distortion of the half-column/half-row pseudo-macroblock quantified in step 308 (FIG. 3) is less than temporary quantified distortion 404 (FIG. 4) by at least the half-column/half-row threshold less temporary threshold 406. If so, the benefit of half-column/half-row motion estimation is sufficiently better than motion estimation using each of (i) whole pixels, (ii) half-column pixels, and (iii) half-row pixels to outweigh additional processing required to derive half-column/half-row pixels and processing transfers to step 322 (FIG. 3). In step 322, motion estimator/compensator 208 (FIG. 4) builds as temporary motion vector 402 a motion vector to the half-column/half-row pseudo-macroblock and stores as temporary quantified distortion 404 the distortion quantified in step 308 (FIG. 3). Conversely, if the distortion of the half-column/half-row pseudo-macroblock quantified in step 308 is not less than temporary quantified distortion 404 (FIG. 4) by at least the half-column/half-row threshold less temporary threshold 406, the benefit of half-column/half-row motion estimation is not sufficiently better than whole pixel, half-column pixel, or half-row pixel motion estimation to outweigh the additional processing burden imposed and motion estimator/compensator 208 skips step 322.(Figure 3) such that temporary motion vector 402 (Figure d) remains unchanged.

In step 324 (FIG. 3), motion estimator/compensator 208 (FIG. 4) uses temporary motion vector 402 in encoding the macroblock and processing according to logic flow diagram 300 (FIG. 3) completes. Thus, according to logic flow diagram 300, motion estimator/compensator 208 (FIG. 2) uses half-pixel motion estimation only when motion estimator/compensator 208 determines that benefits of using half-pixel estimation outweigh any additional processing incurred as a result. In addition, various levels of additional requisite processing associated with each of half-column, half-row, and half-column/half-row motion estimation are considered and only the specific type of half-pixel motion estimate which provides benefits in excess of additional processing costs is implemented. In this way, motion estimator/compensator 208 reduces the processing requirements of a decoder while simultaneously obtaining significant benefit from half-pixel motion estimation.

Inclusion of Video Signal Compressor in a Computer System

Figure 5:
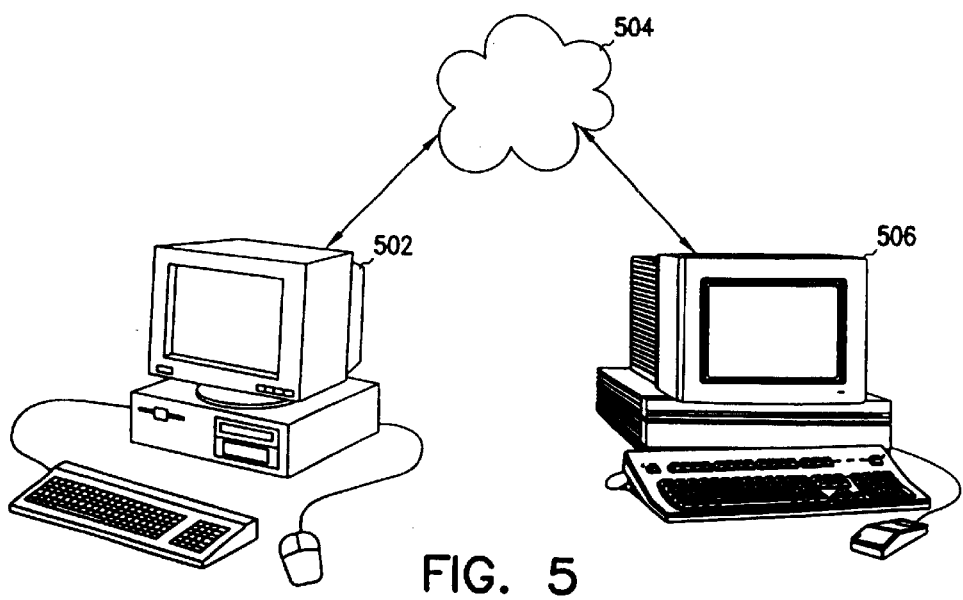
FIG. 5 is a block diagram of a server computer system and a client computer system connected through a network.

In general, motion video signal encoder 200 (FIG. 2) encodes motion video signals for transmission through a computer network such as computer network 504 (FIG. 5). Motion video signal encoder 200 executes within a server computer 502 as described more completely below and server computer 502 transmits the encoded motion video signal through computer network 504 for receipt and real-time decoding of the motion video signal by a client computer 506. For example, a user of client computer 506 can direct client computer 506 to request from server computer 502 a particular video stream. By decoding and displaying the received motion video stream in real-time, i.e., generally at the same rate as the motion video stream is received and while the motion video stream is being received, client computer 506 can display the requested motion video stream shortly after requested by the user. Another application requiring real-time decoding and display of received motion video streams is video conferencing.

Figure 6:
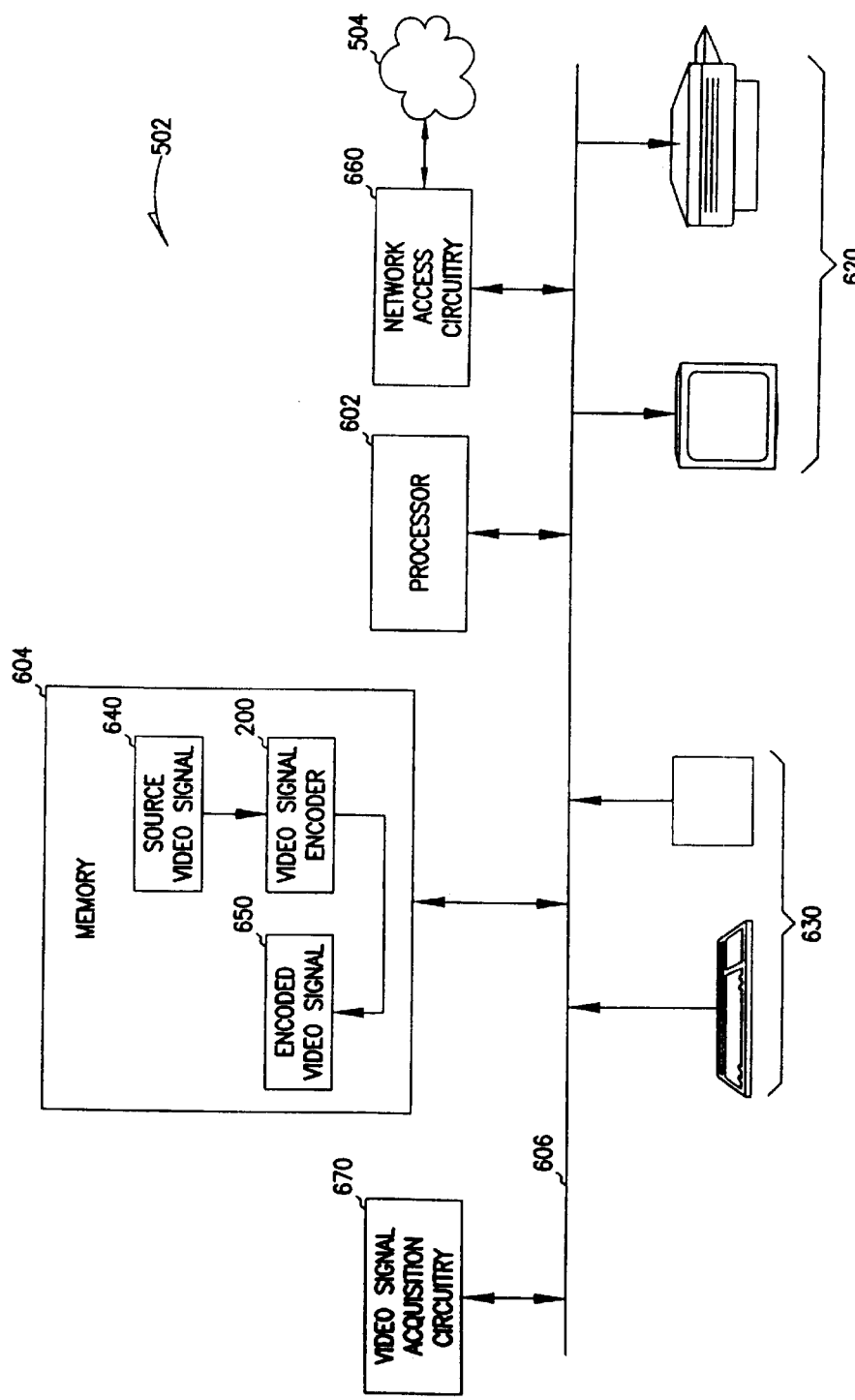
FIG. 6 is a block diagram of the server computer system of FIG. 5 which includes the motion video signal encoder of FIG. 2.

Server computer 502 is shown in greater detail in FIG. 6. Server computer 502 includes a processor 602 and memory 604 which is coupled to processor 602 through an interconnect 606. Interconnect 606 can be generally any interconnect mechanism for computer system components and can be, e.g., a bus, a crossbar, a mesh, a torus, or a hypercube. Processor 602 fetches from memory 604 computer instructions and executes the fetched computer instructions. In addition, processor 602 can fetch computer instructions through computer network 504 through network access circuitry 660 such as a modem or ethernet network access circuitry. Processor 602 also reads data from and writes data to memory 604 and sends data and control signals through interconnect 606 to one or more computer display devices 620 and receives data and control signals through interconnect 606 from one or more computer user input devices 630 in accordance with fetched and executed computer instructions.

Memory 604 can include any type of computer memory and can include, without limitation, randomly accessible memory (RAM), read-only memory (ROM), and storage devices which include storage media such as magnetic and/or optical disks. Memory 604 includes video signal encoder 200 which is all or part of a computer process which in turn executes within processor 602 from memory 604. A computer process is generally a collection of computer instructions and data which collectively define a task performed by server computer 502.

Each of computer display devices 620 can be any type of computer display device including without limitation a printer, a cathode ray tube (CRT), a light-emitting diode WED) display, or a liquid crystal display (LCD). Each of computer display devices 620 receives from processor 602 control signals and data and, in response to such control signals, displays the received data. Computer display devices 620, and the control thereof by processor 602, are conventional.

Each of user input devices 630 can be any type of user input device including, without limitation, a keyboard, a numeric keypad, or a pointing device such as an electronic mouse, trackball, lightpen, touch-sensitive pad, digitizing tablet, thumb wheels, or joystick. Each of user input devices 630 generates signals in response to physical manipulation by a user and transmits those signals through interconnect 606 to processor 602.

Server computer 502 also includes video signal acquisition circuitry 670 which can be, for example, a video camera and video image capture circuitry. Images captured by video image acquisition circuitry 670 are stored in a buffer in memory 604 as source video image 640. Alternatively, motion video images can be captured separately, i.e., by another computer system, and stored in memory 604 as source video signal 640 for encoding and delivery to client computer 506 upon request. In addition, source video signal 640 can be generated by processing of processor 602 or by another computer and stored in memory 604. Computer generated motion video images can be created, for example, by processing 3-dimensional (or 2-dimensional) video models by server computer 502 according to control signals generated by a user by physical manipulation of one or more of user input devices 630.

As described above, video signal encoder 200 executes within processor 602 from memory 604. Specifically, processor 602 fetches computer instructions from video signal encoder 200 and executes those computer instructions. Processor 602, in executing video signal encoder 200, reads frames from source video signal 640, processes and encodes those frames in the manner described above, and stores the encoded frames in encoded video signal 650 or can transmit the encoded frames immediately through computer network 504 to client computer 506 (FIG. 5) which is shown in greater detail in FIG. 7.

Client computer 506 includes a processor 702, memory 704, interconnect 706, computer display devices 720, user input devices 730, and network access circuitry 760, which are analogous to processor 602 (FIG. 6), memory 604, interconnect 606, computer display devices 620, user input devices 630, and network access circuitry 660, respectively, of server computer 502. Video signal decoder 700 (FIG. 7) is all or part of a computer process executing within processor 702 from memory 704. Video signal decoder 700 receives encoded motion video signals from server computer 502 through computer network 504 and reconstructs frames of a motion videoimage from the encoded motion video signals, to thereby decode the encoded motion video signals, and displays the reconstructed frames on one or more of computer display devices 720 for viewing by a user. The decoding and display of the motion video signals is conventional in one embodiment.

An Alternative Approach

Figure 7:
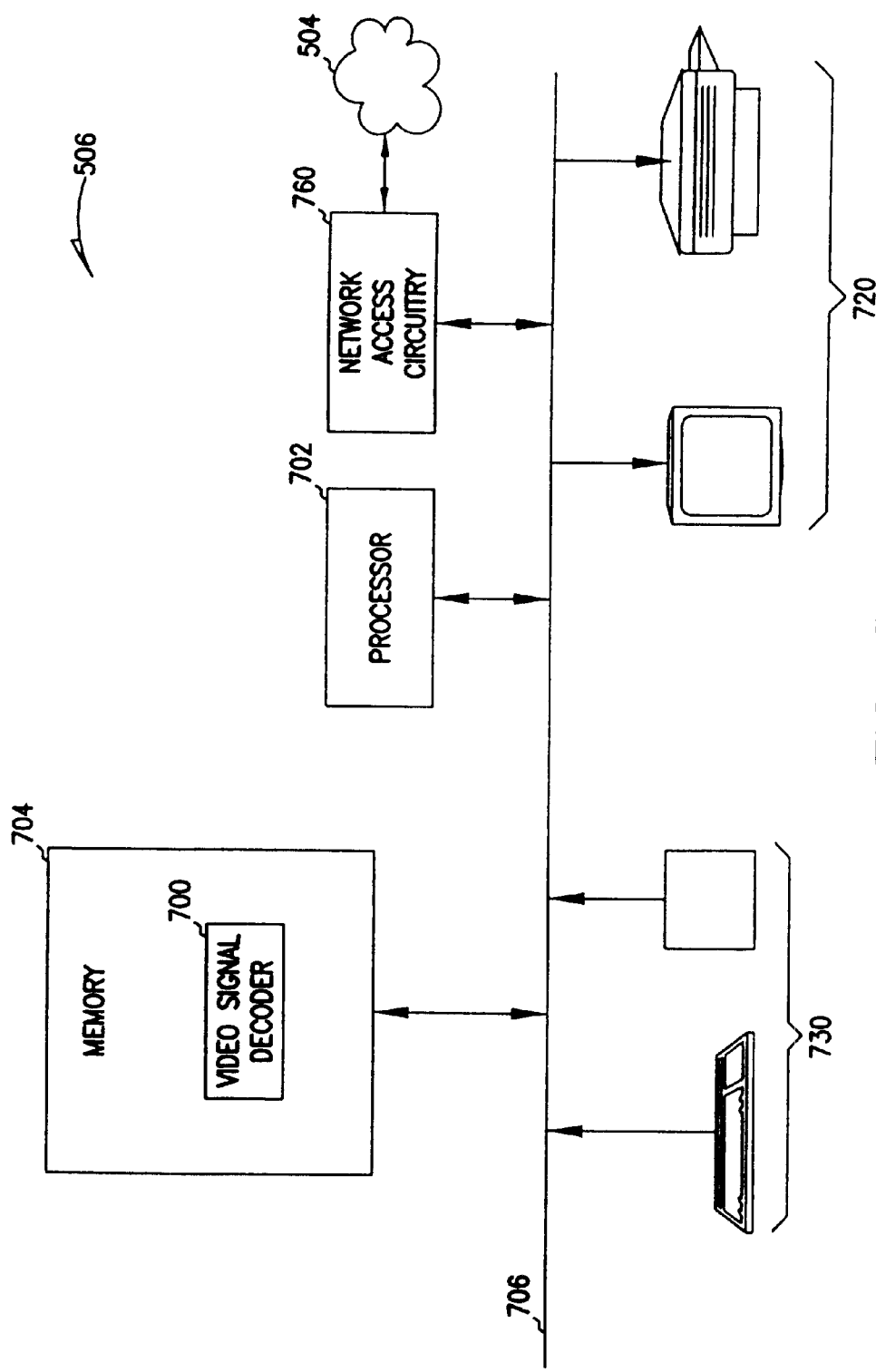
FIG. 7 is a block diagram of the client computer system of FIG. 5.
Figure 8:
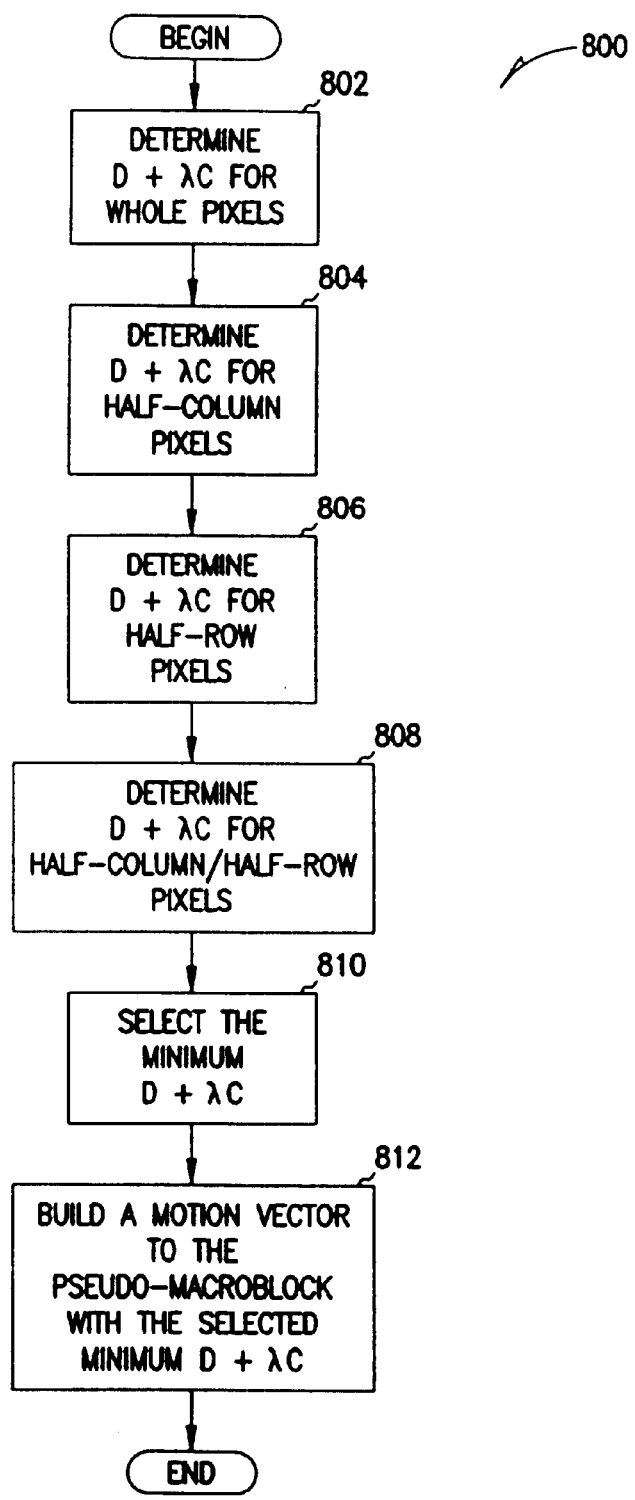
FIG. 8 is a logic flow diagram illustrating the processing of the motion estimator/compensator of FIG. 2 in accordance with an alternative embodiment of the present invention.

Logic flow diagram 800 (FIG. 8) illustrates processing by motion estimator/compensator 208 (FIG. 2) in an alternative embodiment of the present invention. In this alternative embodiment, motion estimator/compensator 208 evaluates an expression, namely, D+λC, which represents a combination of distortion as represented by D and computational complexity as represented by C. Distortion refers to any differences between a macroblock as encoded and the original macroblock before encoding. Computational complexity refers to the amount of processing required by client computer system 506 to decode the encoded macroblock. λ represents a selected compromise between distortion and computational complexity. The expression D+λC has a greater value when distortion and/or computation complexity are unduly increased and has a lesser value when distortion and computation complexity are both relatively small. It should be noted that, with respect to half-pixel vis-à-vis' whole pixel motion estimation, reduction in computational complexity tends to increase distortion, although not always linearly. Conversely, increases in computation complexity tend to decrease distortion but not necessarily linearly.

λ is selected according to the computational capacity of client computer system 506 FIG. 7). For example, relatively slow computer systems such as those based upon the 386 and 486 series of microprocessors available from Intel Corporation of Santa Clara, Calif. may require that λ has a relatively large value. Conversely, if client computer system 506 has considerable computational capacity, such as computer systems based upon the Pentium series of microprocessors available from Intel Corporation and having clock speeds in excess of 200 MHz, may allow λ to have a much smaller value, e.g., approaching zero. As the value of λ approaches zero, computational complexity is nearly ignored while distortion becomes the primary consideration as represented in the expression D+λC. Conversely, if the value of λ is one, computational complexity and distortion have equal weight in the expression D+λC.

Processing according to logic flow diagram 800 (FIG. 8) begins in step 802 in which motion estimator/compensator 2.08 (FIG. 2) evaluates the expression D+λC for whole pixel motion estimation, i.e., for motion estimation using a whole-pixel pseudo-macroblock corresponding to a particular macroblock. Distortion, as represented by D, is expressed in terms of the difference between the macroblock as encoded and the macroblock prior to encoding. In one embodiment, the distortion is measured as an average absolute pixel difference between the macroblock as encoded and the macroblock prior to encoding. In an alternative embodiment, the distortion is measured as an RMS difference between the macroblock as encoded and the macroblock prior to encoding. The computation complexity, as represented by C, represents the processing burden imposed upon client computer system 506 (FIG. 7) in decoding the encoded macroblock. In the case of whole pixel motion estimation, the processing burden is one read operation per pixel.

In step 804 (FIG. 8), motion estimator/compensator 208 (FIG. 2) evaluates the expression D+λC for half-column motion estimation, i.e., for motion estimation using a half-column pseudo-macroblock corresponding to the particular macroblock. The distortion is measured in the same manner as measured in step 802. The computation complexity used in step 804 represents a processing burden of two read operations, two addition operations, and one shift operation per pixel.

In step 806 (FIG. 8), motion estimator/compensator 208 (FIG. 2) evaluates the expression D+λC for half-row motion estimation, i.e., for motion estimation using a half-row pseudo-macroblock corresponding to the particular macroblock. The distortion is measured in the same manner as measured in steps 802–804. The computation complexity used in step 806 represents a processing burden of two read operations, two addition operations, and one shift operation per pixel wherein the read operations access two relatively distant memory locations.

In step 808 (FIG. 8), motion estimator/compensator 208 (FIG. 2) evaluates the expression D+λC for half-column/half-row motion estimation, i.e., for motion estimation using a half-column/half-row pseudo-macroblock corresponding to the particular macroblock. The distortion is measured in the same manner as measured in steps 802–806. The computation complexity used in step 808 represents a processing burden of four read operations, four two addition operations, and one shift operation per pixel wherein the read operations access relatively distant memory locations.

Processing transfers to step 810 (FIG. 8) in which motion estimator/compensator 208 (FIG. 2) determines which of the evaluated expressions, each of which represents a quantified combination of distortion and processing burden, has the smallest value. By doing so, motion estimator/compensator 208 determines which type of motion estimation provides the lowest combination of distortion and computational complexity for the particular λ, i.e., for the particular processing capacity of client computer system 506 (FIG. 5).

In step 812 (FIG. 8), to which processing transfers from step 810, motion estimator/compensator 208 (FIG. 2) builds a motion vector to the pseudo-macroblock having the smallest evaluated expression D+λC. Specifically, if the expression evaluated in step 802 (FIG. 8) is less than all expressions evaluated in steps 804–808, motion estimator/compensator 208 (FIG. 2) builds a motion vector to the whole pixel pseudo-macroblock. Similarly, if the expression evaluated in step 804 (FIG. 8) is less than all expressions evaluated in steps 802, 806, and 808, motion estimator/compensator 208 (FIG. 2) builds a motion vector to the half-column pseudo-macroblock. If the expression evaluated in step 806 (FIG. 8) is less than all expressions evaluated in steps 802, 804, and 808, motion estimator/compensator 208 (FIG. 2) builds a motion vector to the half-row pseudo-macroblock Lastly, if the expression evaluated in step 808 (FIG. 8) is less than all expressions evaluated in steps 802–806, motion estimator/compensator 208 (FIG. 2) builds a motion vector to the half-column/half-row pseudo-macroblock.

Thus, motion estimator/compensator 208 (FIG. 2) uses half-pixel motion estimation only if the reduction in distortion of the encoded macroblock outweighs the computational complexity in terms of processing burden imposed upon client computer system 506 (FIG. 7). In addition, each type of half-pixel motion estimation is considered independently and is used only if the distortion of the macroblock as encoded using the particular type of half-pixel motion estimation is sufficiently reduced to justify the computational complexity of the particular type of half-pixel motion estimation.

The above description is illustrative only and is not limiting. The present invention is limited only by the claims which follow.

What is claimed is:

1. A method for implementing half-pixel motion estimation in encoding a motion video signal, the method comprising:

quantifying a first signal quality associated with a vector from a first pixel block of a first frame of the motion video signal to a whole pixel block of a second frame of the motion video signal;

quantifying a first processing burden associated with deriving the whole pixel block of the second frame;

applying a weighting factor to the first processing burden to generate a first weighted processing burden:

quantifying a second signal quality associated with a vector from the first pixel block to a half-pixel block of the second frame;

quantifying a second processing burden associated with deriving the half-pixel block of the second frame:

applying the weighting factor to the second processing burden to generate a second weighted processing burden; and selectively encoding the first pixel block as a motion vector to one of the half-pixel block and the whole pixel block as a function of the first and second signal qualities and of the first and second weighted processing burdens.

2. The method of claim 1, further comprising:

combining the first signal quality and the first weighted processing burden;

and combining the second signal quality and the second weighted processing burden.

3. The method of claim 1, wherein the weighting factor is a constant.

4. The method of claim 3, wherein the constant represents a processing capacity of a client computer system.

5. The method of claim 1, further comprising quantifying the first and second signal qualities as a function of absolute pixel differences.

6. The method of claim 1, further comprising quantifying the first and second signal qualities as a function of root mean squared differences.

7. The method of claim 1, further comprising comparing a difference between the first and second signal qualities to a threshold that represents a difference between the first and second processing burdens, the threshold having a value greater than zero.

8. The method of claim 1, wherein the whole pixel block is a macroblock and the half-pixel block is a half-pixel pseudo-macroblock.

9. A method for implementing half-pixel motion estimation in encoding a motion video signal, the method comprising:

determining a first cost-benefit quantity as a function of a first signal quality associated with a vector from a first pixel block of a first frame of the motion video signal to a whole pixel block of a second frame of the motion video signal and of a first weighted processing burden associated with deriving the whole pixel block of the second frame;

determining a second cost-benefit quantity as a function of a second signal quality associated with a vector from the first pixel block to a half-pixel block of the second frame and of a second weighted processing burden associated with deriving the half-pixel block of the second frame; and selectively encoding the first pixel block as a motion vector to one of the half-pixel block and the whole pixel block as a function of the first and second cost-benefit quantities.

10. The method of claim 9, further comprising:

encoding the first pixel block as a motion vector to the whole pixel block if the first cost-benefit quantity exceeds the second cost-benefit quantity; and encoding the first pixel block as a motion vector to the half pixel block if the second cost-benefit quantity exceeds the first cost-benefit quantity.

11. The method of claim 10, further comprising:

weighting the first processing burden by a constant to generate the first weighted processing burden;

combining the first signal quality and the first weighted processing burden;

weighting the second processing burden by the constant to generate the second weighted processing burden; and combining the second signal quality and the second weighted processing burden.

12. The method of claim 11, wherein the constant has a value of one.

13. The method of claim 11, wherein the constant represents a processing capacity of a client computer system.

14. The method of claim 10, further comprising quantifying the first and second signal qualities as a function of absolute pixel differences.

15. The method of claim 10, further comprising quantifying the first and second signal qualities as a function of root mean squared differences.

16. The method of claim 10, further comprising comparing a difference between the first and second signal qualities to a threshold that represents a difference between the first and second processing burdens, the threshold having a value greater than zero.

17. The method of claim 10, wherein the whole pixel block is a macroblock and the half-pixel block is a half-pixel pseudo-macroblock.

18. A computer-readable medium useful in association with a computer that includes a processor and a memory, the computer-readable medium including computer executable instructions that are configured to cause the computer to implement half-pixel motion estimation in encoding a motion video signal by:

quantifying a first signal. quality associated with a vector from a first pixel block of a first frame of the motion video signal to a whole pixel block of a second frame of the motion video signal;

quantifying a first processing burden associated with deriving the whole pixel block of the second frame;

applying a weighting factor to the first processing burden to generate a first weighted processing burden;

quantifying a second signal quality associated with a vector from the first pixel block to a half-pixel block of the second frame;

quantifying a second processing burden associated with deriving the half-pixel block of the second frame;

applying the weighting factor to the second processing burden to generate a second weighted processing burden; and selectively encoding the first pixel block as a motion vector to one of the half-pixel block and the whole pixel block as a function of the first and second signal qualities and of the first and second weighted processing burdens.

19. The computer-readable medium of claim 18, wherein the computer executable instructions are further configured to cause the computer to implement half-pixel motion estimation in encoding a motion video signal by:

combining the first signal quality and the first weighted processing burden;

and combining the second signal quality and the second weighted processing burden.

20. The computer-readable medium of claim 18, wherein the weighting factor is a constant.

21. The computer-readable medium of claim 20, wherein the constant represents a processing capacity of a client computer system.

22. The computer-readable medium of claim 18, wherein the computer-executable instructions are further configured to cause the computer to implement half-pixel motion estimation in encoding a motion video signal by quantifying the first and second signal qualities as a function of absolute pixel differences.

23. The computer-readable medium of claim 18, wherein the computer-executable instructions are further configured to cause the computer to implement half-pixel motion estimation in encoding a motion video signal by quantifying the first and second signal qualities as a function of root mean squared differences.

24. The computer-readable medium of claim 18, wherein the computer-executable instructions are further configured to cause the computer to implement half-pixel motion estimation in encoding a motion video signal by comparing a difference between the first and second signal qualities to a threshold that represents a difference between the first and second processing burdens, the threshold having a value greater than zero.

25. The computer-readable medium of claim 18, wherein the whole pixel block is a macroblock and the half-pixel block is a half-pixel pseudo-macroblock.

26. A computer-readable medium useful in association with a computer that includes a processor and a memory, the computer-readable medium including computer executable instructions that are configured to cause the computer to implement half-pixel motion estimation in encoding a motion video signal by:

determining a first cost-benefit quantity as a function of a first signal quality associated with a vector from a first pixel block of a first frame of the motion video signal to a whole pixel block of a second frame of the motion video signal and of a first weighted processing burden associated with deriving the whole pixel block of the second frame;

determining a second cost-benefit quantity as a function of a second signal quality associated with a vector from the first pixel block to a half-pixel block of the second frame and of a second weighted processing burden associated with deriving the half-pixel block of the second frame; and selectively encoding the first pixel block as a motion vector to one of the half-pixel block and the whole pixel block as a function of the first and second cost-benefit quantities.

27. The computer-readable medium of claim 26, wherein the computer-executable instructions are further configured to cause the computer to implement half-pixel motion estimation in encoding a motion video signal by:
   encoding the first pixel block as a motion vector to the whole pixel block if the first cost-benefit quantity exceeds the second cost-benefit quantity; and
   encoding the first pixel block as a motion vector to the half pixel block if the second cost-benefit quantity exceeds the first cost-benefit quantity.

28. The computer-readable medium of claim 26, wherein the computer executable instructions are further configured to cause the computer to implement half-pixel motion estimation in encoding a motion video signal by:
   weighting the first processing burden by a constant to generate the first weighted processing burden;
   combining the first signal quality and the first weighted processing burden;
   weighting the second processing burden by the constant to generate the second weighted processing burden; and
   combining the second signal quality and the second weighted processing burden.

29. The computer-readable medium of claim 28, wherein the constant has a value of one.

30. The computer-readable medium of claim 28, wherein the constant represents a processing capacity of a client computer system.

31. The computer-readable medium of claim 26, wherein the computer-executable instructions are farther configured to cause the computer to implement half-pixel motion estimation in encoding a motion video signal by quantifying the first and second signal qualities as a function of absolute pixel differences.

32. The computer-readable medium of claim 26, wherein the computer-executable instructions are further configured to cause the computer to implement half-pixel motion estimation in encoding a motion video signal by quantifying the first and second signal qualities as a function of root mean squared differences.

33. The computer-readable medium of claim 26, wherein the computer-executable instructions are further configured to cause the computer to implement half-pixel motion estimation in encoding a motion video signal by comparing a difference between the first and second signal qualities to a threshold that represents a difference between the first and second processing burdens, the threshold having a value greater than zero.

34. The computer-readable medium of claim 26, wherein the whole pixel block is a macroblock and the half-pixel block is a half-pixel pseudo-macroblock.

35. A computer system comprising:
   a processor;
   a memory operatively coupled to the processor; and
   a motion video signal encoder that executes in the processor from the memory and that, when executed by the processor, implements half-pixel motion estimation in encoding a video signal by
     quantifying a first signal quality associated with a vector from a first pixel block of a first frame of the motion video signal to a whole pixel block of a second frame of the motion video signal,
     quantifying a first processing burden associated with deriving the whole pixel block of the second frame,
     applying a weighting factor to the first processing burden to generate a first weighted processing burden,
     quantifying a second signal quality associated with a vector from the first pixel block to a half-pixel block of the second frame,
     quantifying a second processing burden associated with deriving the half-pixel block of the second frame,
     applying the weighting factor to the second processing burden to generate a second weighted processing burden, and
     selectively encoding the first pixel block as a motion vector to one of the half-pixel block and the whole pixel block as a function of the first and second signal qualities and of the first and second weighted processing burdens.

36. The computer system of claim 35, wherein the motion video signal encoder is further configured to implement half-pixel motion estimation in encoding a video signal by:
   combining the first signal quality and the first weighted processing burden;
   and
   combining the second signal quality and the second weighted processing burden.

37. The computer system of claim 35, wherein the weighting factor is a constant.

38. The computer system of claim 37, wherein the constant represents a processing capacity of a client computer system.

39. The computer system of claim 35, wherein the motion video signal encoder is further configured to implement half-pixel motion estimation in encoding a video signal by quantifying the first and second signal qualities as a function of absolute pixel differences.

40. The computer system of claim 35, wherein the motion video signal encoder is further configured to implement half-pixel motion estimation in encoding a video signal by quantifying the first and second signal qualities as a function of root mean squared differences.

41. The computer system of claim 35, wherein the motion video signal encoder is further configured to implement half-pixel motion estimation in encoding a video signal by comparing a difference between the first and second signal qualities to a threshold that represents a difference between the first and second processing burdens, the threshold having a value greater than zero.

42. The computer system of claim 35, wherein the whole pixel block is a macroblock and the half-pixel block is a half-pixel pseudo-macroblock.

43. A computer system comprising:
   a processor;
   a memory operatively coupled to the processor; and
   a motion video signal encoder that executes in the processor from the memory and that, when executed by the processor, implements half-pixel motion estimation in encoding a video signal by
     determining a first cost-benefit quantity as a function of a first signal quality associated with a vector from a first pixel block of a first frame of the motion video signal to a whole pixel block of a second frame of the motion video signal and of a first weighted processing burden associated with deriving the whole pixel block of the second frame,
     determining a second cost-benefit quantity as a function of a second signal quality associated with a vector from the first pixel block to a half-pixel block of the second frame and of a second weighted processing burden associated with deriving the half-pixel block of the second frame, and selectively encoding the first pixel block as a motion vector to one of the half-pixel block and the whole pixel block as a function of the first and second cost-benefit quantities.

44. The computer system of claim 43, wherein the motion video signal encoder is further configured to implement half-pixel motion estimation in encoding a video signal by:

encoding the first pixel block as a motion vector to the whole pixel block if the first cost-benefit quantity exceeds the second cost-benefit quantity; and encoding the first pixel block as a motion vector to the half pixel block if the second cost-benefit quantity exceeds the first cost-benefit quantity.

45. The computer system of claim 43, wherein the motion video signal encoder is further configured to implement half-pixel motion estimation in encoding a video signal by:

weighting the first processing burden by a constant to generate the first weighted processing burden;

combining the first signal quality and the first weighted processing burden;

weighting the second processing burden by the constant to generate the second weighted processing burden; and combining the second signal quality and the second weighted processing burden.

46. The computer system of claim 45, wherein the constant has a value of one.

47. The computer system of claim 45, wherein the constant represents a processing capacity of a client computer system.

48. The computer system of claim 43, wherein the motion video signal encoder is further configured to implement half-pixel motion estimation in encoding a video signal by quantifying the first and second signal qualities as a function of absolute pixel differences.

49. The computer system of claims 43, wherein the motion video signal encoder is further configured to implement half-pixel motion estimation in encoding a video signal by quantifying the first and second signal qualities as a function of root mean squared differences.

50. The computer system of claim 43, wherein the motion video signal encoder is further configured to implement half-pixel motion estimation in encoding a video signal by comparing a difference between the first and second signal qualities to a threshold that represents a difference between the first and second processing burdens, the threshold having a value greater than zero.

51. The computer system of claim 43, wherein the whole pixel block is a macroblock and the half-pixel block is a half-pixel pseudo-macroblock.

* * * * *

UNITED STATES PATENT AND TRADEMARK OFFICE
CERTIFICATE OF CORRECTION

PATENT NO.      : 6,473,461 B1
DATED           : October 29, 2002
INVENTOR(S)     : Wang It is certified that error appears in the above-identified patent and that said Letters Patent is hereby corrected as shown below:

Column 1,
Line 17, replace "(SSS)" with -- (DSS) --.
Line 23, delete "dc" after "of".
Line 31, replace "(WEG)" with -- (MPEG) --.

Column 2,
Line 2, replace "infegrity" with -- integrity --.
Line 47, replace "previoustame" with -- previous frame --.

Column 3,
Line 10, replace "minimising" with -- minimizing --.

Column 7,
Line 32, replace "With" with -- with --.

Column 10,
Line 25, replace "(Figure d)" with -- (Figure 4) --.

Column 11,
Line 27, replace "WED)" with -- (LED) --.

Column 17,
Line 33, replace "farther" with -- further --.

Column 20,
Line 11, replace "claims" with -- claim --.

Signed and Sealed this

Twenty-fifth Day of February, 2003

JAMES E. ROGAN
*Director of the United States Patent and Trademark Office*